(12) United States Patent
Tseng

(10) Patent No.: US 10,362,626 B2
(45) Date of Patent: Jul. 23, 2019

(54) METHOD AND APPARATUS FOR HANDLING DRX (DISCONTINUOUS RECEPTION) OPERATION IN A WIRELESS COMMUNICATION SYSTEM

(71) Applicant: ASUSTek Computer Inc., Taipei (TW)

(72) Inventor: Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/785,914

(22) Filed: Oct. 17, 2017

(65) Prior Publication Data
US 2018/0110085 A1 Apr. 19, 2018

Related U.S. Application Data

(60) Provisional application No. 62/409,125, filed on Oct. 17, 2016.

(51) Int. Cl.
*H04W 76/28* (2018.01)
*H04L 1/18* (2006.01)
(Continued)

(52) U.S. Cl.
CPC ............ *H04W 76/28* (2018.02); *H04L 1/188* (2013.01); *H04L 1/1812* (2013.01);
(Continued)

(58) Field of Classification Search
CPC .................................................. H04W 76/28
(Continued)

(56) References Cited

U.S. PATENT DOCUMENTS

2009/0232054 A1* 9/2009 Wang ................ H04W 52/0225
370/328
2011/0250918 A1* 10/2011 Jen ......................... H04W 52/08
455/509
2015/0305056 A1 10/2015 Vangala

FOREIGN PATENT DOCUMENTS

| EP | 3226456 | 4/2017 |
|---|---|---|
| JP | 2017-017633 | 1/2017 |
| WO | 2014073799 | 5/2014 |

OTHER PUBLICATIONS

Huawei et al: "Impact on HARQ and DRX of Two-stage scheduling", 3GPP TSG-RAN 2G2, Meeting #95bis, Kaohsiung, Oct. 10-14, 2016, Tdoc R2-166460.
(Continued)

*Primary Examiner* — Joel Ajayi
(74) *Attorney, Agent, or Firm* — Blue Capital Law Firm, P.C.

(57) ABSTRACT

A method and apparatus are disclosed from the perspective of a UE. In one embodiment, the method includes monitoring a control channel for detection of an UL grant. The method further includes receiving the UL grant associated with a HARQ process on the control channel at a first timing. The method also includes sending an UL data associated with the UL grant on a data channel at a second timing. In additional, the method also includes starting a retransmission timer associated with the HARQ process after detection of the UL grant at a third timing. Furthermore, the method includes receiving a signaling indicating stop the retransmission timer at a fourth timing. In addition, the method includes stopping the retransmission timer and stopping monitoring the control channel, wherein the UE monitors the control channel when the retransmission timer is running.

6 Claims, 15 Drawing Sheets

(51) Int. Cl.
*H04W 72/14* (2009.01)
*H04W 72/04* (2009.01)
*H04W 88/02* (2009.01)

(52) U.S. Cl.
CPC ......... *H04L 1/1883* (2013.01); *H04W 72/042* (2013.01); *H04W 72/14* (2013.01); *H04W 88/02* (2013.01)

(58) Field of Classification Search
USPC .................................................. 370/329
See application file for complete search history.

(56) References Cited

OTHER PUBLICATIONS

Ericsson: "Inactivity timer for Multi-subframe scheduling", 3GPP TSG-RAN WG2, Meeting #95bis, Kaohsiung, Taiwan, Oct. 10-14, 2016, Tdoc R2-166712.

Ericsson: "MAC handling of data transmission with 2-step granting", 3GPP TSG-RAN WG2 #95bis, Kaohsiung, Taiwan, Oct. 10-14, 2016, Tdoc R2-166709.

Ericsson: "DRX and 2-step granting", 3GPP TSG-RAN WG2 #95bis, Kaohsiung, Taiwan, Oct. 10-14, 2016, Tdoc R2-166713.

"3rd Generation Partnership Project; Technical Specification Group Radio Access Network; Evolved Universal Terrestrial Radio Access (E-UTRA); Medium Access Control (MAC) protocol specification (Release 14)", 3GPP Standard; 3GPP TS 36.321 V14.0.0, (Sep. 2016), 650 Route des Lucioles-Sophia Antipolis, Valbonne-France. pp. 1-96.

Nokia et al: "On Two-Stage UL scheduling for eLAA", 3GPP TSG RAN WG1 Meeting #85, Nanjing, China, May 23-27, 2016, Tdoc R1-164942.

Huawei et al: "Introduction of enhanced LAA for LTE", 3GPP TSG-RAN WG2, Meeting #95, Gothenburg, Sweden, Aug. 22-26, 2016, Tdoc R2-165964.

European Search Report from corresponding EP Application No. 17196752.4, dated Feb. 27, 2018.

Huawei, "Impact on HARQ and DRX of Two-stage scheduling Kaohsiung", 3GPP TSG-RAN WG2 Meeting #95bis R2-166460, Oct. 10-14, 2016.

Ericsson,"Inactivity timer for Multisubframe scheduling", 3GPP TSG-RAN WG2 Meeting #95bis R2-166712, Kaohsiung, Taiwan, Oct. 10-14, 2016.

Office Action from Taiwan Intellectual Property Office in the corresponding TW Application No. 106135550, dated Sep. 17, 2018.

3GPF TS 36.321 V14.0.0(Sep. 2016), Oct. 3, 2016, p. 43-45, URL, Internet:<URL:http://www.3gpp.org/ftp/Specs/archive/36_series/36.321/36321-e00.zip>.

Office Action from Japan Patent Office in corresponding JP Application No. 2017-200771, dated Nov. 20, 2018.

\* cited by examiner

|  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| PDCCH |  | P1 |  | P2 |  |  |  |  |  |  |  |  |  |  |  |  |  |  |  |  |  |  |  |
| PUSCH |  |  |  |  |  | U1 |  |  | U2 |  |  |  |  |  |  |  |  |  |  |  |  |  |  |
| HARQ RTT timer 1 |  |  |  |  |  | | | | |  |  |  |  |  |  |  |  |  |  |  |  |  |  |
| DRX ULRetx timer 1 |  |  |  |  |  |  |  |  |  | Keep monitoring PDCCH | | | | | | | | |  |  |  |  |  |
| HARQ RTT timer 2 |  |  |  |  |  |  |  |  | | | |  |  |  |  |  |  |  |  |  |  |  |  |
| DRX ULRetx timer 1 |  |  |  |  |  |  |  |  |  |  |  |  | Keep monitoring PDCCH | | | | | | | |  |  |  |

Pn: PDCCH n

Un: UL data n

Un is associated with Pn.

FIG. 10

|  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| PDCCH |  | P1 |  | P2 |  |  |  |  |  |  |  |  |  |  | P3 |  |  |  |  |  |  |  |  |
| PUSCH |  |  |  |  |  | U1 |  |  | U2 |  |  |  |  |  |  |  |  |  |  |  |  |  |  |
| PDSCH / PHICH |  |  |  |  |  |  |  |  |  |  |  |  |  |  | S |  |  |  |  |  |  |  |  |
| HARQ RTT timer 1 |  |  |  |  |  |  |  |  |  |  |  |  |  |  |  |  |  |  |  |  |  |  |  |
| DRX ULRetx timer 1 |  |  |  |  |  |  |  |  |  | Monitor | Monitor | Monitor | Monitor | Monitor | Monitor | Not monitor | Not monitor | Not monitor | Not monitor |  |  |  |  |
| HARQ RTT timer 2 |  |  |  |  |  |  |  |  |  |  |  |  |  |  |  |  |  |  |  |  |  |  |  |
| DRX ULRetx timer 1 |  |  |  |  |  |  |  |  |  |  |  |  | Monitor | Monitor | Not monitor | Not monitor | Not monitor | Not monitor | Not monitor | Not monitor | Not monitor | Not monitor | Not monitor |

FIG. 11

|  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| PDCCH |  | P1 |  | P2 |  |  |  |  |  |  |  |  |  |  | P3 |  |  |  |  |  |  |  |  |
| PUSCH |  |  |  |  |  | U1 |  |  | U2 |  |  |  |  |  |  |  |  |  |  |  |  |  |  |
| PDSCH / PHICH |  |  |  |  |  |  |  |  |  |  |  |  |  |  | S |  |  |  |  |  |  |  |  |
| HARQ RTT timer 1 |  |  |  |  |  |  |  |  |  |  |  |  |  |  |  |  |  |  |  |  |  |  |  |
| DRX ULRetx timer 1 |  |  |  |  |  |  |  |  |  | Monitor | | | | | | | | | | |  |  |  |
| HARQ RTT timer 2 |  |  |  |  |  |  |  |  |  |  |  |  |  |  |  |  |  |  |  |  |  |  |  |
| DRX ULRetx timer 1 |  |  |  |  |  |  |  |  |  |  |  |  | Monitor | Not monitor | | | | | | |  |  |  |

FIG. 12

| A new LCID indicating stopping relevant DRX UL Retx Timers |
|---|

| Hq_id 0 | Hq_id 1 | Hq_id 2 | Hq_id 3 | Hq_id 4 | Hq_id 5 | Hq_id 6 | Hq_id 7 |
|---|---|---|---|---|---|---|---|
| Hq_id 8 | Hq_id 9 | Hq_id 10 | Hq_id 11 | Hq_id 12 | Hq_id 13 | Hq_id 14 | Hq_id 15 |

Hq_id means HARQ process Identify

| 0 | 1 | 1 | 1 | 0 | 0 | 0 | 0 |
|---|---|---|---|---|---|---|---|
| 0 | 0 | 0 | 0 | 0 | 0 | 0 | 0 |

FIG. 13

METHOD AND APPARATUS FOR HANDLING DRX (DISCONTINUOUS RECEPTION) OPERATION IN A WIRELESS COMMUNICATION SYSTEM

CROSS-REFERENCE TO RELATED APPLICATIONS

The present Application claims the benefit of U.S. Provisional Patent Application Ser. No. 62/409,125 filed on Oct. 17, 2016, the entire disclosure of which is incorporated herein in its entirety by reference.

FIELD

This disclosure generally relates to wireless communication networks, and more particularly, to a method and apparatus for handling DRX operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes monitoring a control channel for detection of an UL (Uplink) grant. The method further includes receiving the UL grant associated with a HARQ (Hybrid Automatic Repeat Request) process on the control channel at a first timing. The method also includes sending an UL data associated with the UL grant on a data channel at a second timing. In additional, the method also includes starting a retransmission timer associated with the HARQ process after detection of the UL grant at a third timing. Furthermore, the method includes receiving a signaling indicating stop the retransmission timer at a fourth timing. In addition, the method includes stopping the retransmission timer and stopping monitoring the control channel, wherein the UE monitors the control channel when the retransmission timer is running.

BRIEF DESCRIPTION OF THE DRAWINGS

FIG. 10 is a diagram according to one exemplary embodiment.

FIG. 11 is a diagram according to one exemplary embodiment.

FIG. 12 is a diagram according to one exemplary embodiment.

FIG. 13 is a diagram according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TS 36.321 v14.0.0, "E-UTRA; Media Access Control (MAC); Protocol specification (Release 14)"; TS 36.331 v14.0.0, "E-UTRA; Radio Resource Control (RRC); Protocol specification (Release 14)"; R2-166460, "Impact on HARQ and DRX of Two-stage scheduling", Huawei and HiSilicon; R2-166709, "MAC handling of data transmission with 2-step granting", Ericsson; and R2-166713, "DRX and 2-step granting", Ericsson. The standards and documents listed above are hereby expressly incorporated by reference in their entirety.

Figure 1:
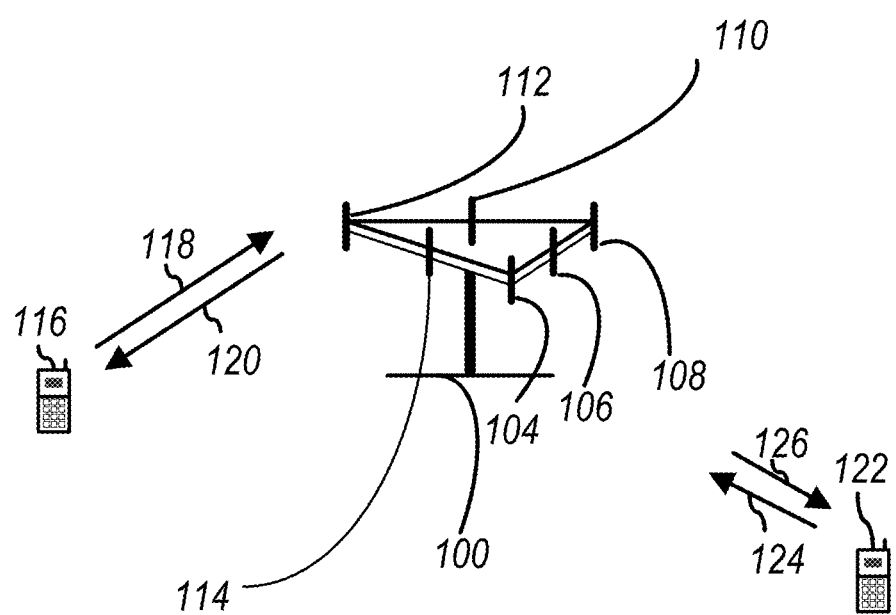
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
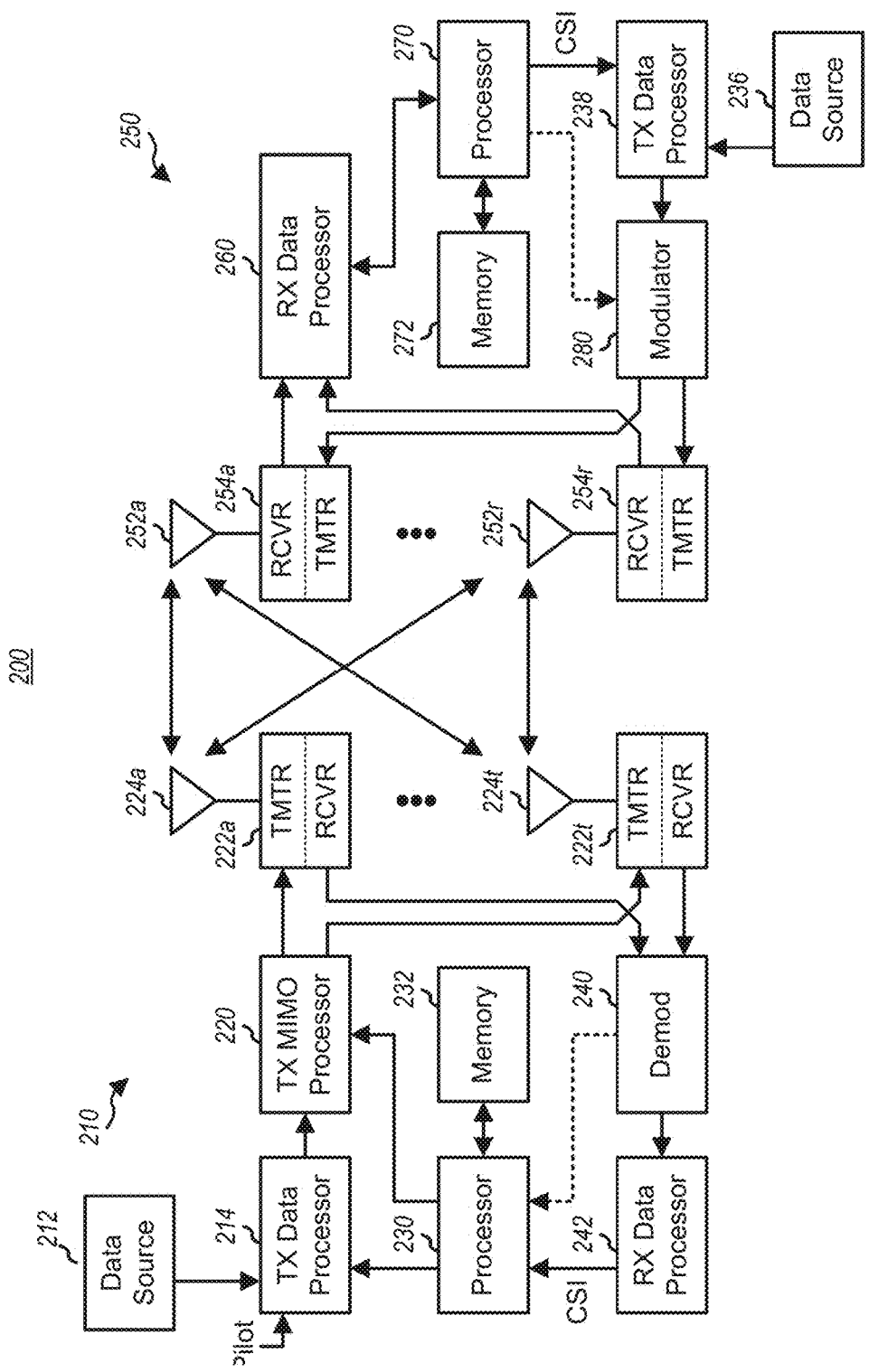
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
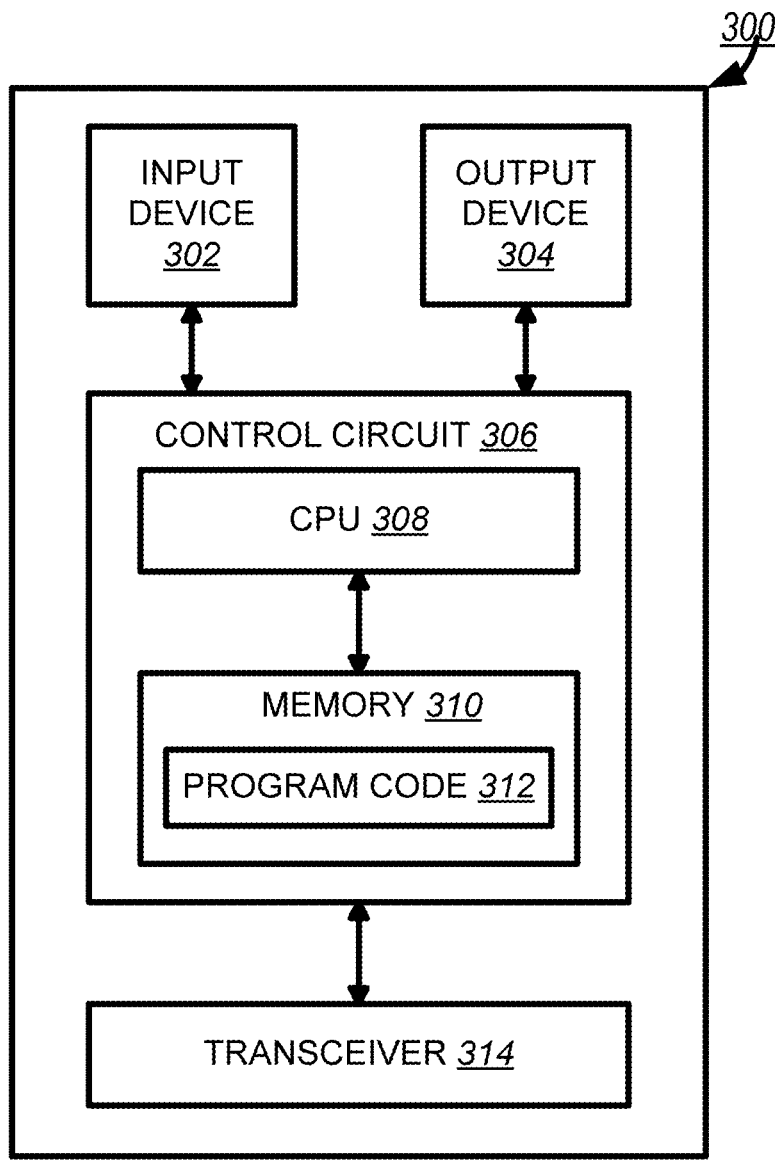
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
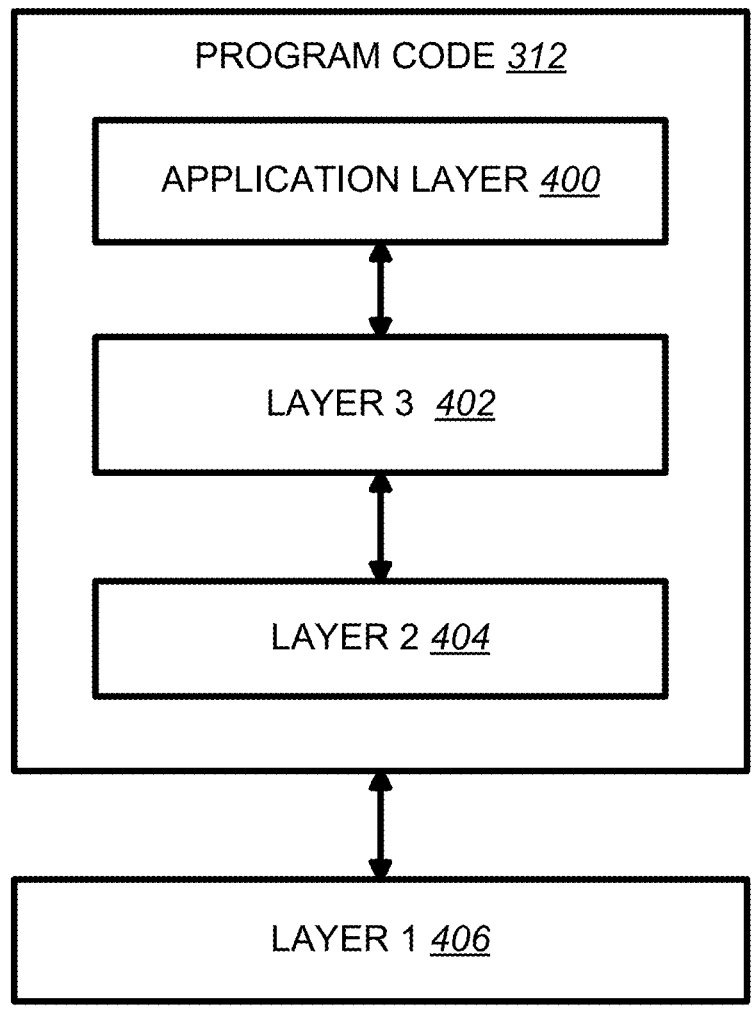
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.321 states:

3.1 Definitions

For the purposes of the present document, the terms and definitions given in TR 21.905 [1] and the following apply. A term defined in the present document takes precedence over the definition of the same term, if any, in TR 21.905 [1].

Active Time: Time related to DRX operation, as defined in subclause 5.7, during which the MAC entity monitors the PDCCH.

mac-ContentionResolutionTimer: Specifies the number of consecutive subframe(s) during which the MAC entity shall monitor the PDCCH after Msg3 is transmitted.

DRX Cycle: Specifies the periodic repetition of the On Duration followed by a possible period of inactivity (see FIG. 3.1-1 below).

Figure 5:
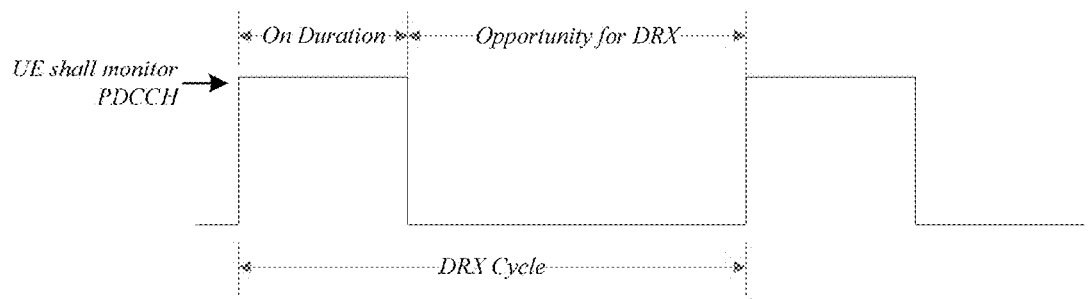
FIG. 5 is a reproduction of FIG. 3.1-1 of 3GPP TS 36.321 v14.0.0.

[FIG. 3.1-1 of 3GPP TS 36.321 v14.0.0, Entitled "DRX Cycle", is Reproduced as FIG. 5]

drx-InactivityTimer: Except for NB-IoT, it specifies the number of consecutive PDCCH-subframe(s) after the subframe in which a PDCCH indicates an initial UL, DL or SL user data transmission for this MAC entity. For NB-IoT, it specifies the number of consecutive PDCCH-subframe(s) after the subframe in which the HARQ RTT timer or UL HARQ RTT timer expires.

drx-RetransmissionTimer: Specifies the maximum number of consecutive PDCCH-subframe(s) until a DL retransmission is received.

drxShortCycleTimer: Specifies the number of consecutive subframe(s) the MAC entity shall follow the Short DRX cycle.

drxStartOffset: Specifies the subframe where the DRX Cycle starts.

drx-ULRetransmissionTimer: Specifies the maximum number of consecutive PDCCH-subframe(s) until a grant for UL retransmission is received.

HARQ information: HARQ information for DL-SCH or for UL-SCH transmissions consists of New Data Indicator (NDI), Transport Block (TB) size. For DL-SCH transmissions and for asynchronous UL HARQ, the HARQ information also includes HARQ process ID, except for UEs in NB-IoT for which this information is not present. For UL-SCH transmission the HARQ information also includes Redundancy Version (RV). In case of spatial multiplexing on DL-SCH the HARQ information comprises a set of NDI and TB size for each transport block. HARQ information for SL-SCH and SL-DCH transmissions consists of TB size only.

HARQ RTT Timer: This parameter specifies the minimum amount of subframe(s) before a DL HARQ retransmission is expected by the MAC entity.

Msg3: Message transmitted on UL-SCH containing a C-RNTI MAC CE or CCCH SDU, submitted from upper layer and associated with the UE Contention Resolution Identity, as part of a random access procedure.

NB-IoT: NB-IoT allows access to network services via E-UTRA with a channel bandwidth limited to 180 kHz.

NB-IoT UE: A UE that uses NB-IoT.

onDurationTimer: Specifies the number of consecutive PDCCH-subframe(s) at the beginning of a DRX Cycle.

PDCCH: Refers to the PDCCH [7], EPDCCH (in subframes when configured), MPDCCH [2], for an RN with R-PDCCH configured and not suspended, to the R-PDCCH or, for NB-IoT to the NPDCCH.

PDCCH period (pp): Refers to the interval between the start of two consecutive PDCCH occasions and depends on the currently used PDCCH search space [2]. A PDCCH occasion is the start of a search space and is defined by subframe k0 as specified in section 16.6 of [2]. For an NB-IoT UE, if a timer duration is configured by upper layers in units of a PDCCH period, the calculation of number of PDCCH-subframes for the timer is done by multiplying the number of PDCCH periods with npdcch-NumRepetitions-RA when the UE uses the common search space or by npdcch-NumRepetitions when the UE uses the UE specific search space.

PDCCH-subframe: Refers to a subframe with PDCCH. For a MAC entity not configured with any TDD serving cell(s), this represents any subframe; for a MAC entity configured with at least one TDD serving cell, if a MAC entity is capable of simultaneous reception and transmission in the aggregated cells, this represents the union over all serving cells of downlink subframes and subframes including DwPTS of the TDD UL/DL configuration indicated by tdd-Config [8], except serving cells that are configured with schedulingCellId [8]; otherwise, this represents the subframes where the SpCell is configured with a downlink subframe or a subframe including DwPTS of the TDD UL/DL configuration indicated by tdd-Config [8].

For RNs with an RN subframe configuration configured and not suspended, in its communication with the E-UTRAN, this represents all downlink subframes configured for RN communication with the E-UTRAN.

For SC-PTM reception on a FDD cell, this represents any subframe of the cell except MBSFN subframes; for SC-PTM reception on a TDD cell, this represents the downlink subframes and subframes including DwPTS of the TDD UL/DL configuration indicated by tdd-Config [8] of the cell except MBSFN subframes.

NOTE: In the definition of PDCCH-subframe, for serving cell operating according to Frame Structure Type 3 all subframes are considered as downlink subframes.

PDSCH: Refers to PDSCH or for NB-IoT to NPDSCH.

[ . . . ]

5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), eIMTA-RNTI (if configured), SL-RNTI (if configured), and CC-RNTI (if configured). When in RRC_CONNECTED, if DRX is configured, the MAC entity is allowed to monitor the PDCCH discontinuously using the DRX operation specified in this subclause; otherwise the MAC entity monitors the PDCCH continuously. When using DRX operation, the MAC entity shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), drx-ULRetransmissionTimer (one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined (see subclause 7.7).

When a DRX cycle is configured, the Active Time includes the time while:

onDurationTimer or drx-InactivityTimer or drx-Retransmission Timer or drx-ULRetransmissionTimer or mac-ContentionResolutionTimer (as described in subclause 5.1.5) is running; or a Scheduling Request is sent on PUCCH and is pending (as described in subclause 5.4.4); or an uplink grant for a pending HARQ retransmission can occur and there is data in the corresponding HARQ buffer for synchronous HARQ process; or a PDCCH indicating a new transmission addressed to the C-RNTI of the MAC entity has not been received after successful reception of a Random Access Response for the preamble not selected by the MAC entity (as described in subclause 5.1.4).

When DRX is configured, the MAC entity shall for each subframe:
if a HARQ RTT Timer expires in this subframe:
  if the data of the corresponding HARQ process was not successfully decoded:
    start the drx-RetransmissionTimer for the corresponding HARQ process;
  if NB-IoT, start or restart the drx-InactivityTimer.
if an UL HARQ RTT Timer expires in this subframe:
  start the drx-ULRetransmissionTimer for the corresponding HARQ process.
  if NB-IoT, start or restart the drx-InactivityTimer.
if a DRX Command MAC control element or a Long DRX Command MAC control element is received:
  stop onDurationTimer;
  stop drx-InactivityTimer.
if drx-InactivityTimer expires or a DRX Command MAC control element is received in this subframe:
  if the Short DRX cycle is configured:
    start or restart drxShortCycleTimer;
    use the Short DRX Cycle.
  else:
    use the Long DRX cycle.
if drxShortCycleTimer expires in this subframe:
  use the Long DRX cycle.
if a Long DRX Command MAC control element is received:
  stop drxShortCycleTimer;
  use the Long DRX cycle.
If the Short DRX Cycle is used and [(SFN*10)+subframe number] modulo (shortDRX-Cycle)=(drxStartOffset) modulo (shortDRX-Cycle); or
if the Long DRX Cycle is used and [(SFN*10)+subframe number] modulo (longDRX-Cycle)=drxStartOffset:
  if NB-IoT:
    if neither HARQ RTT Timer nor UL HARQ RTT Timer is running, start onDurationTimer.
  else:
    start onDurationTimer.
during the Active Time, for a PDCCH-subframe, if the subframe is not required for uplink transmission for half-duplex FDD UE operation, and if the subframe is not a half-duplex guard subframe [7] and if the subframe is not part of a configured measurement gap and if the subframe is not part of a configured Sidelink Discovery Gap for Reception, and for NB-IoT if the subframe is not required for uplink transmission or downlink reception other than on PDCCH; or
during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap and if the subframe is not part of a configured Sidelink Discovery Gap for Reception; or
during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap and if the subframe is not part of a configured Sidelink Discovery Gap for Reception:
monitor the PDCCH;
if the PDCCH indicates a DL transmission or if a DL assignment has been configured for this subframe:
  if the UE is an NB-IoT UE, a BL UE or a UE in enhanced coverage:
    start the HARQ RTT Timer for the corresponding HARQ process in the subframe containing the last repetition of the corresponding PDSCH reception;
  else:
    start the HARQ RTT Timer for the corresponding HARQ process;
  stop the drx-Retransmission Timer for the corresponding HARQ process.
if the PDCCH indicates an UL transmission for an asynchronous HARQ process:
  start the UL HARQ RTT Timer for the corresponding HARQ process in the subframe containing the last repetition of the corresponding PUSCH transmission;
  except for NB-IoT, stop the drx-ULRetransmissionTimer for the corresponding HARQ process.
if the PDCCH indicates a new transmission (DL, UL or SL):
  except for NB-IoT, start or restart drx-InactivityTimer.
if the PDCCH indicates a transmission (DL, UL) for a NB-IoT UE:
  stop drx-InactivityTimer, drx-ULRetransmissionTimer and onDurationTimer.
in current subframe n, if the MAC entity would not be in Active Time considering grants/assignments/DRX Command MAC control elements/Long DRX Command MAC control elements received and Scheduling Request sent until and including subframe n-5 when evaluating all DRX Active Time conditions as specified in this subclause, type-0-triggered SRS [2] shall not be reported.
if CQI masking (cqi-Mask) is setup by upper layers:
  in current subframe n, if onDurationTimer would not be running considering grants/assignments/DRX Command MAC control elements/Long DRX Command MAC control elements received until and including subframe n-5 when evaluating all DRX Active Time conditions as specified in this subclause, CQI/PMI/RI/PTI/CRI on PUCCH shall not be reported.
else:
  in current subframe n, if the MAC entity would not be in Active Time considering grants/assignments/DRX Command MAC control elements/Long DRX Command MAC control elements received and Scheduling Request sent until and including subframe n-5 when evaluating all DRX Active Time conditions as specified in this subclause, CQI/PMI/RI/PTI/CRI on PUCCH shall not be reported.

Regardless of whether the MAC entity is monitoring PDCCH or not, the MAC entity receives and transmits HARQ feedback and transmits type-1-triggered SRS [2] when such is expected.

NOTE: The same Active Time applies to all activated serving cell(s).

NOTE: In case of downlink spatial multiplexing, if a TB is received while the HARQ RTT Timer is running and the previous transmission of the same TB was received at least N subframes before the current subframe to $k_{ULHARQRTT}$ subframes for TDD, where $k_{ULHARQRTT}$ equals to the $k_{PHICH}$ value indicated in Table 9.1.2-1 of [2].

For NB-IoT, the UL HARQ RTT timer length is set to 4+deltaPDCCH subframes, where deltaPDCCH is the interval from the last subframe of the PUSCH transmission plus 4 subframes to the first subframe of the next PDCCH occasion.

3GPP TS 36.331 states:

```
DRX-Config-r13 ::=                SEQUENCE {
    onDurationTimer-v1310             ENUMERATED {psf300, psf400, psf500, psf600,
                                        psf800, psf1000, psf1200, psf1600}
                                        OPTIONAL,  --Need OR
    drx-RetransmissionTimer-v1310    ENUMERATED {psf40, psf64, psf80, psf96, psf112,
                                        psf128, psf160, psf320}
                                        OPTIONAL,  --Need OR
    drx-ULRetransmissionTimer-r13    ENUMERATED {psf0, psf1, psf2, psf4, psf6, psf8,
                               psf16,
                                        psf24, psf33, psf40, psf64, psf80, psf96,
                                        psf112, psf128, psf160, psf320}
                                        OPTIONAL   --Need OR
}
```

(where N corresponds to the HARQ RTT Timer), the MAC entity should process it and restart the HARQ RTT Timer.

NOTE: The BL UE and the UE in enhanced coverage waits until the last subframe of the configured MPDCCH search space before executing the next specified action.

7.7 HARQ RTT Timers

For each serving cell, in case of FDD configuration and in case of Frame Structure Type 3 configuration on the serving cell which carries the HARQ feedback for this serving cell the HARQ RTT Timer is set to 8 subframes. For each serving cell, in case of TDD configuration on the serving cell which carries the HARQ feedback for this serving cell the HARQ RTT Timer is set to k+4 subframes, where k is the interval between the downlink transmission and the transmission of associated HARQ feedback, as indicated in subcla uses 10.1 and 10.2 of [2], and for an RN configured with rn-SubframeConfig [8] and not suspended, as indicated in Table 7.5.1-1 of [11].

For BL UEs and UEs in enhanced coverage, HARQ RTT Timer corresponds to 7+N where N is the used PUCCH repetition factor, where only valid (configured) UL subframes as configured by upper layers in fdd-UplinkSubframeBitmapBR are counted. In case of TDD, HARQ RTT Timer corresponds to 3+k+N, where k is the interval between the last repetition of downlink transmission and the first repetition of the transmission of associated HARQ feedback, and N is the used PUCCH repetition factor, where only valid UL subframes are counted as indicated in subclauses 10.1 and 10.2 of [2].

For NB-IoT the HARQ RTT Timer is set to k+3+N+deltaPDCCH subframes, where k is the interval between the last subframe of the downlink transmission and the first subframe of the associated HARQ feedback transmission and N is the transmission duration in subframes of the associated HARQ feedback, and deltaPDCCH is the interval from the last subframe of the associated HARQ feedback transmission plus 3 subframes to the first subframe of the next PDCCH occasion.

Except for NB-IoT, UL HARQ RTT Timer length is set to 4 subframes for FDD and Frame Structure Type 3, and set 3GPP R2-166460 states:
At RAN1#84bis [1], RAN1 agreed

---

RAN1#84bis Agreements:
Confirm the working assumption
The minimum latency is 4 ms between the subframe carrying the UL grant and subframe(s) of the corresponding PUSCH(s)

---

At RAN1#86 [2], RAN1 agreed two-stage scheduling is supported for eLAA.

---

RAN1#86 Agreement:
DCI 0A/4A/0B/4B includes a single bit to indicate whether the UL grant is
a triggered grant or not.
If it is a triggered grant, the UE may transmit after receiving a 1 bit trigger in the PDCCH DCI scrambled with CC-RNTI in a subframe received after the subframe carrying the UL grant
The timing between the 2nd trigger transmitted in subframe N and the earliest UL transmission is a UE capability, if the earliest UL transmission is before subframe N + 4 (UE capability signaling between transmission in subframe N + 1 and N + 2 and N + 3)
The 4 bit field 'SF timing' in DCI format 0A/4A/0B/4B for the triggered grant is reused as follows:
  When the UE may transmit after reception of the trigger is signaled to the UE 2 bits are reused to indicate X:
    Having received a trigger in subframe N, the UE is allowed to start transmission in subframe N + X + Y
    X = {0, 1, 2, 3} indicated reusing two bits in the DCI
    Y is given by the UL burst offset in the C-PDCCH DCI scrambled by
      CC-RNTI in the same subframe where the trigger is transmitted
  The UE receives signaling in the first DCI 0A/4A/0B/4B grant indicating
    the number of subframes after which the grant becomes invalid reusing 2
    bits. The initial grant becomes invalid if M ms after the initial grant, no valid trigger has been received.
    2 bit: M = {8, 12, 16, 20}
UE follows the LBT type indicated by the UL grant

---

In this contribution, we discuss the possible impact on HARQ and DRX based on RAN1 agreements and provide our considerations.

[ . . . ]

For Two-stage scheduling, a triggered grant is introduced to trigger the previous valid UL grant(s), i.e. UL transmission for a UL grant is only allowed to be performed in a subframe belonging to the valid time indicated in its DCI. When Two-stage scheduling and multiple subframes scheduling are used simultaneously, from MAC's perspective, the MAC layer receives multiple UL grants from lower layers and stores these grants in the corresponding HARQ processes. Each UL grant is used to generate a transmission in a certain subframe indicated by the uplink grant and triggered grant. Meanwhile the valid time for all UL grants received from lower layers is the same. Therefore the transmission time for some UL transmission may be out of the valid time after receiving a triggered grant as shown in FIG. 1. For this case, the HARQ process shall not instruct the physical layer to generate a transmission when the subframe for UL transmission is out of the valid time, e.g. SF N+3 and N+4 in FIG. 1.

Figure 6:
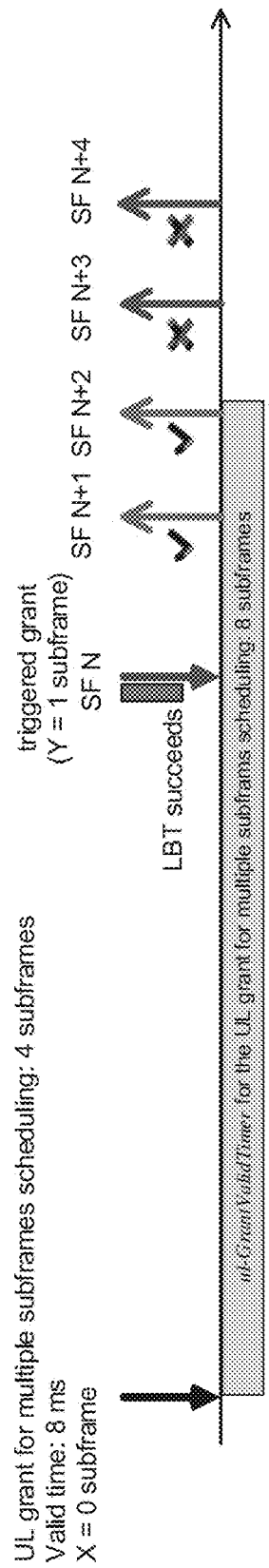
FIG. 6 is a reproduction of FIG. 1 of 3GPP R2-166460.

[FIG. 1 of 3GPP R2-166460, Which Illustrates an Example of Two-Stage Scheduling, is Reproduced as FIG. 6]

For both single subframe scheduling and multiple subframes scheduling, the MAC layer needs to identify the subframe when a transmission should take place after receiving the uplink grant and triggered grant. To avoid arbitrary UE's behaviors on transmitting data, a new Timer, e.g. ul-GrantValidTimer, is required to control the MAC's instruction for each transmission, i.e. the HARQ process shall not instruct the physical layer to generate a transmission in the subframe when the timer is not running or the remaining time is not able to cover the scheduled subframe. More specifically, the timer can be started in the subframe receiving the UL grant. The length of the timer can reuse the valid time indicated in the UL grant. After receiving the triggered grant, the MAC layer can know about the subframe to transmit, which needs to be judged whether it is within the valid time or not according to the timer. Then, the MAC layer can stop the timer. Moreover, the timer is configured per UL grant from RAN2 perspective based on its valid time.

Proposal 1: For Two-stage scheduling, a new Timer, e.g. ul-GrantValidTimer per UL grant is required for MAC layer to instruct the physical layer to generate a transmission.

The Timer is started/restarted in the subframe receiving a UL grant;

The length of the Timer reuses the valid time of the received UL grant;

The Timer is stopped in the subframe receiving the corresponding triggered grant.

Issue 2: Active Time for Triggered Grant when DRX is Configured

At last meeting, RAN2 agreed the awaked UE shall control the UE's PDCCH monitoring for CC-RNTI. Based on RAN1 #86 agreements, the triggered grant is scrambled with CC-RNTI. Therefore in addition to monitor normal UL grant the UE also needs to monitor PDCCH for the triggered grant. Currently the DRX mechanism for Active Time is described as below:

[ . . . ]

Considering the Active Time after receiving an UL grant, there are two cases which need to be addressed as follows:
UL grant for new transmission Based on the current specification if the received UL grant indicates a new transmission, the UE starts the drx-InactivityTimer. When the drx-InactivityTimer is running, the UE monitors the PDCCH and if nothing is received until the drx-InactivityTimerexpires, the UE will go to sleep.

However by introducing Two-stage scheduling, the UE needs to receive not only the UL grant, but also the triggered grant. If the drx-InactivityTimer expires before triggered grant is sent, the UE is not able to continue subsequent data transmission. Therefore one straight forward solution is to configure the drx-InactivityTimer appropriately, i.e. the expiration time is long enough to include the reception of triggered grant,e.g. to always set to the value of the valid time for UL grant. The corresponding example is shown in FIG. 2.

Figure 7:
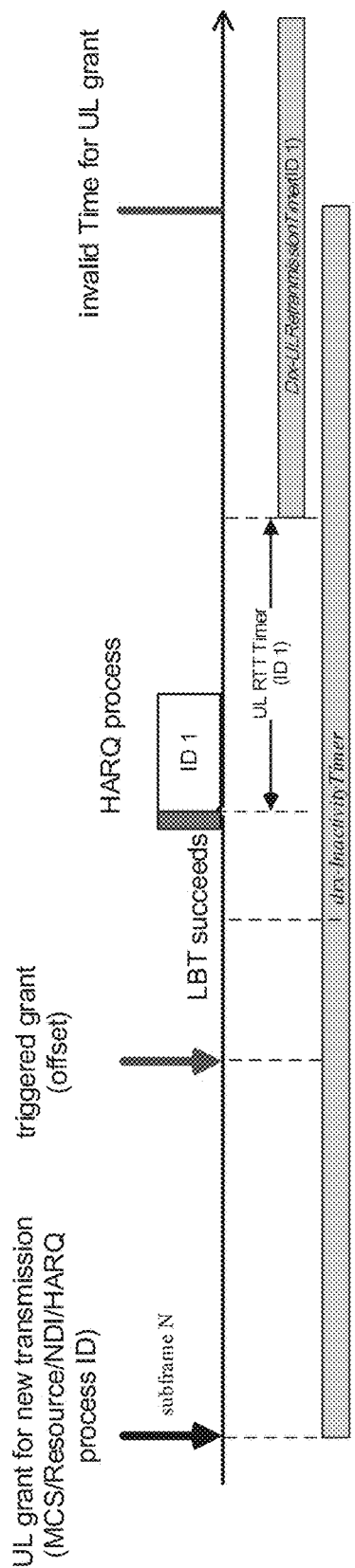
FIG. 7 is a reproduction of FIG. 2 of 3GPP R2-166460.

[FIG. 2 of 3GPP R2-166460, Which Illustrates an Example of drx for UL Grant for New Transmission in Two-Stage Scheduling, is Reproduced as FIG. 7]

Observation 1: In case of UL grant for new transmission, the triggered grant may be received under appropriate configuration of drx-InactivityTimer.

UL grant for retransmission

Based on the current specification if the received UL grant indicates a retransmission, the UE stops the drx-ULRetransmissionTimer. Simliar as the analysis above, if we still only use the existing drx-ULRetransmissionTimer mechanism for Two-stage scheduling, it is difficult to guarantee the reception of the triggered grant. The corresponding example is shown in FIG. 3.

Figure 8:
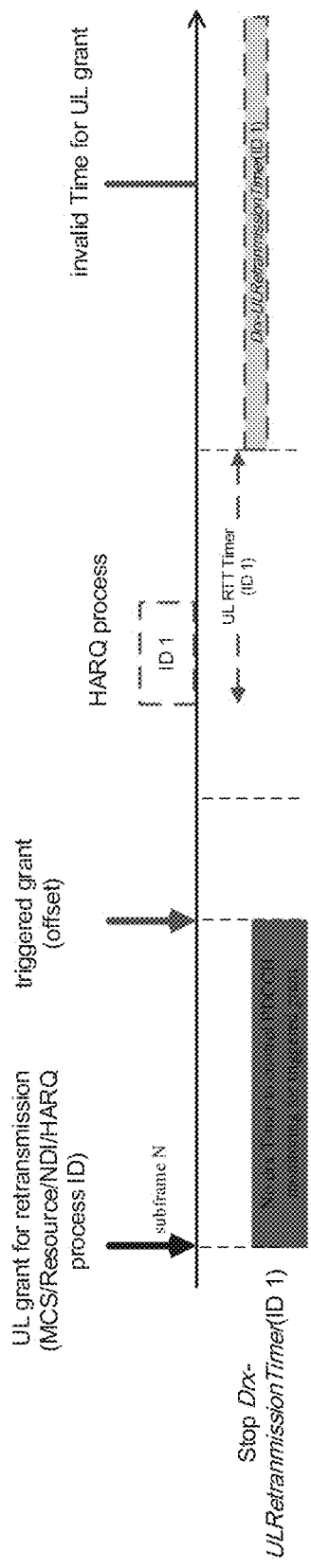
FIG. 8 is a reproduction of FIG. 3 of 3GPP R2-166460.

[FIG. 3 of 3GPP R2-166460, Which Illustrates an Example of drx for UL Grant for Retransmission in Two-Stage Scheduling, is Reproduced as FIG. 8]

3GPP R2-166709 states:

RAN1 has added a "2-step grant" where the UE first gets a grant in PDCCH but the time of when the grant is valid is not known yet to the UE. Instead, the eNB indicates with a second step when the grant is valid.

The time from the UE receiving the second step until the UE performs the transmission is down to 1-2 TTIs. So we assume the UE must have prepared the TB before the second step arrives.

Figure 9:
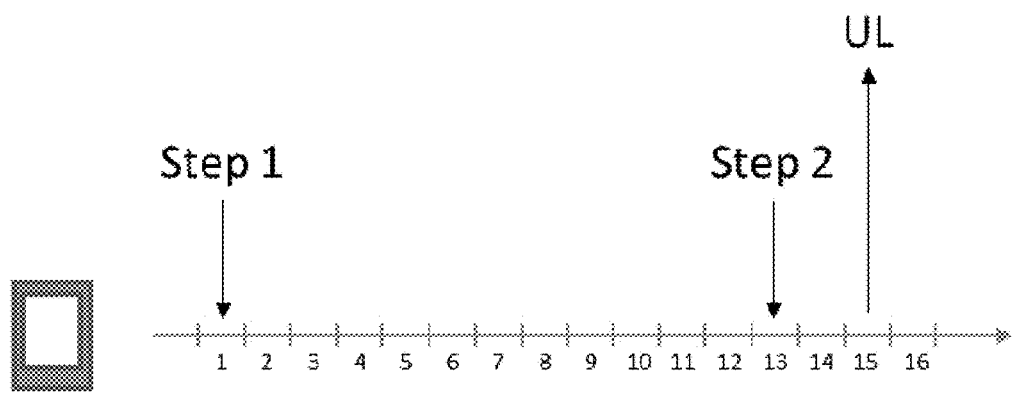
FIG. 9 is a reproduction of a figure of 3GPP R2-166709 and R2-166713.

An figure showing the 2-step grant framework is shown in the figure below [which is reproduced as FIG. 9].

[ . . . ]

Since the time from Step 2 until the UL transmission is only one or two TTIs, we assume the UE prepares the TB and placed it in a HARQ buffer before Step 2 arrives. We assume this because the normal processing time is 4 TTIs, so the UE must have created the TB before Step 2 arrives as otherwise there would not be enough time for the UE to perform the transmission. And further, the UE does not know whether Step 2 will arrive shortly or long after Step 1, therefore the UE must start preparing the TB as soon as the UE receives Step 1.

Observation 1 The UE must prepare the transport block upon reception of Step 1 and place it in a HARQ buffer.

The validity of Step 1 is 20 ms meaning that if the eNB sends Step 1 in TTI N the UE only considers this information valid up to TTI N+20. When step 1 then becomes invalid the eNB can no longer trigger the UE to perform the transmission by sending Step 2. The question is then, should this be considered a transmission from MAC point of view or not?

Due to Observation 1, we assume the UE has already when receiving Step 1 prepared the TB and placed it in a HARQ buffer. If RAN2 decides that this transmission was never performed from a MAC point of view it means that the UE must "pull up" the TB from the HARQ buffer de-multiplex the content, hand back the data back to the corresponding RLC entities, de-concatenate the content of each RLC PDU. This would allow the UE to instead transmit the data shortly after the grant becomes invalid.

This improves latency, which is good. But assuming that this is not a common scenario we assume RAN2 should not need to optimize for it. Instead we think the data can remain in the HARQ buffer and HARQ retransmissions can be used in those cases when Step-2 disappears. Based on this we think that MAC should consider data as transmitted if Step-2 does not arrive in time.

Proposal 1 For 2-step granting, MAC considers data as transmitted even if Step-2 is never received.

If the UE does not have an UL grant the UE will transmit an SR to the eNB to make the eNB aware that the UE wants to get scheduled (or trigger a RA procedure in case SR is not configured). Of course if the eNB has already provided a grant to the UE, there would be no point of the UE sending an SR since the UE can soon transmit using the SR. This holds also for the case of 2-step granting. Hence, we think that it makes no sense for the UE to transmit an SR when the UE has received Step-1 and this should also be considered as uplink resources.

Proposal 2 If the UE has a valid step-1, the UE does not transmit SR or trigger RA due to an SR being pending. 3GPP R2-166713 states:

RAN1 has added a "2-step grant" where the UE first gets a grant in PDCCH but the time of when the grant is valid is not known yet to the UE. Instead, the eNB indicates with a second step when the grant is valid.

An figure showing the 2-step grant framework is shown in the figure below [which is reproduced as FIG. 9].

[ . . . ]

In case the eNB has given a Step-1 to the UE it is important that the UE is awake to be able to receive the associated Step-2. One way to ensure this is that the UE starts the inactivity timer when receiving Step-1 and then let the eNB configure a long enough inactivity timer value ensuring that it does not expire before the UE gets Step-2. This would work but it would reduce the UE's power consumption since any LAA-UE which the eNB plans to use 2-step granting for must always have a long enough inactivity timer, even if currently the UE is scheduled with normal (1-step) grants. We therefore think the UE shall always be in Active Time when it is waiting for Step-2.

Proposal 1 The UE is in active time between Step-1 and Step-2.

Then about the inactivity timer, when the UE finally gets Step-2 the UE performs (shortly thereafter) an uplink transmission. Since the UE gets scheduled (and receives PDCCH) the UE shall start the inactivity timer allowing the eNB to schedule the UE further.

Proposal 2 The UE starts the inactivity timer when receiving Step-2.

In case the UE does not receive Step-2 after Step-1 has been given to the UE, the UE would consider Step-1 invalid. The reason Step-2 was never received may be because the eNB was not able to access the channel to transmit Step-2. When this happens, the eNB would likely want to schedule the UE another time (since indeed the UE had some data to transmit), therefore we think the UE should stay awake giving the eNB a chance to give a new grant and the UE should therefore start the DRX inactivity timer.

Proposal 3 The UE starts the inactivity timer when Step-1 becomes invalid.

For asynchronous UL (Uplink) HARQ (Hybrid Automatic Repeat Request) operation, a UE could stay active to keep monitoring a potential UL grant on control channel like PDCCH (Physical Downlink Control Channel) for retransmitting an UL data if a network does not receive the UL data successfully as shown in FIG. 10. The UE receives PDCCH 1 (P1), sends a UL data 1 (U1) on PUSCH (Physical Uplink Shared Channel) corresponding to P1, and stays active on monitoring PDCCH to see if any UL grant is detected on PDCCH to retransmit U1. P2 and U2 are a similar case. If U1 or U2 has been received and decoded successfully, the UE's power for monitoring PDCCH would be wasted. According to the current design of LTE, it could be tens of milliseconds (ms) or even more than 100 ms.

To avoid such power waste, a signaling is used to inform a UE stopping relevant DRX timers for a potential scheduling of UL data on a control channel. In one embodiment, the signaling may be carried in a MAC (Medium Access Control) control signaling. In one embodiment, the signaling may reuse DRX MAC CE (Control Element) or Long DRX MAC CE in LTE design. In addition, the signaling may be configurable by RRC (Radio Resource Control) to configure if a MAC CE is able to also stop UL Retx timer. If reusing the MAC CE, the signaling may apply for all relevant UL Retx timers (e.g., all relevant UL HARQ processes).

In one embodiment, the signaling may be carried on a control channel like PDCCH or PHICH (Physical Hybrid—ARQ Indicator Channel). Information in the signaling may be associated with one or more HARQ process. If the control channel like PHICH could not carry too much information, the control channel may be just associated with one UL HARQ process (e.g., based on the timing relationship between PDCCH, PUSCH, or PHICH) or all UL HARQ processes. Such information may be also carried in a new MAC control signaling like a new MAC CE.

FIG. 11 shows an example in which all Retx timers are stopped through a control channel (e.g., PDCCH or PHICH) or data channel (e.g., MAC control signaling on PDSCH). FIG. 12 illustrates an example where not all Retx timers are stopped.

FIG. 13 shows one example that 16 HARQ processes are used (i.e., a new LCID with two bytes of information) and DRX Retx timer 1/2/3 corresponding to HARQ process ID 1/2/3 are stopped. It is also possible to use just a new LCID (i.e., a new MAC CE with zero size) to indicate all relevant Retx timers are stopped.

Figure 14:
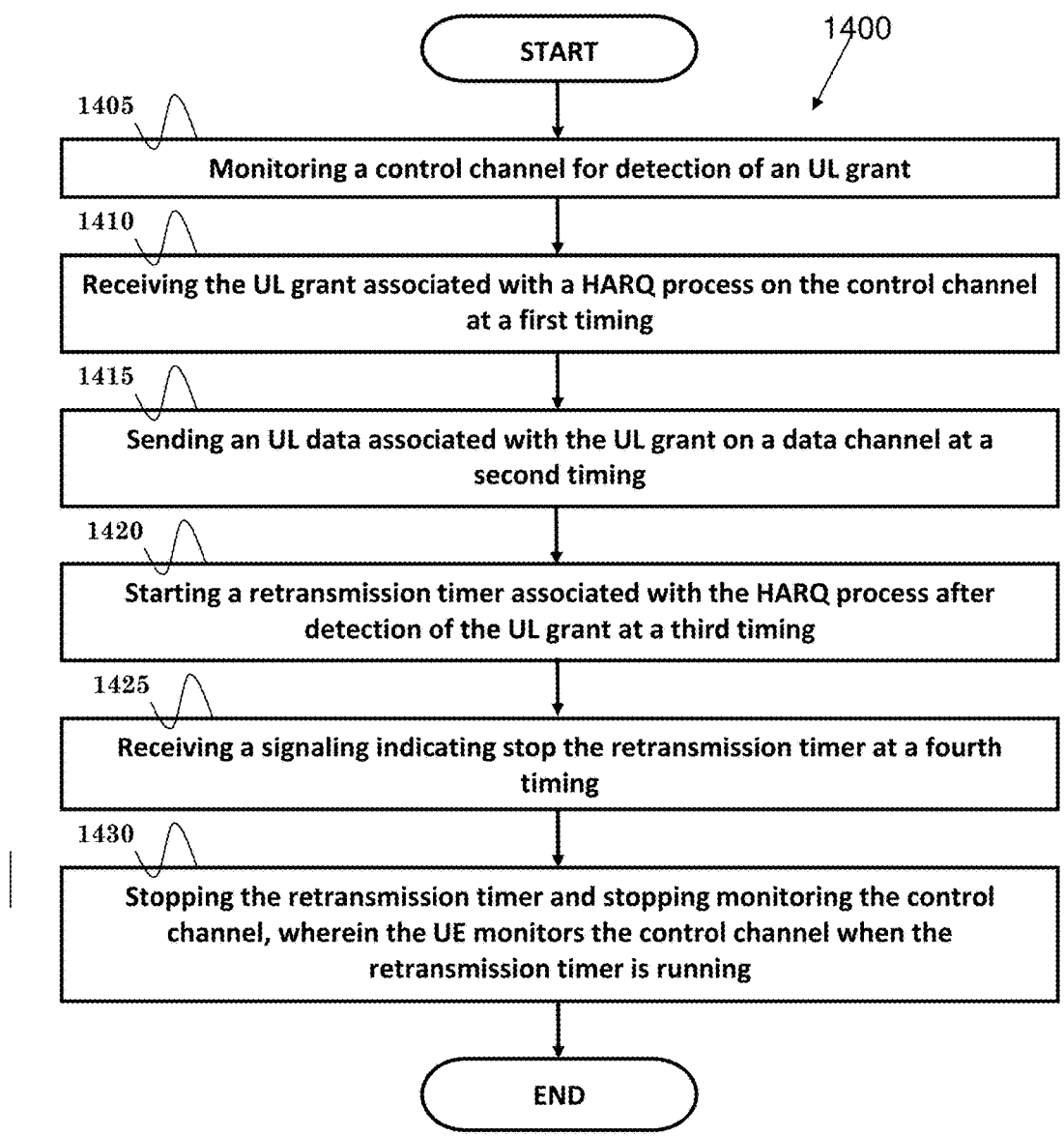
FIG. 14 is a flow chart according to one exemplary embodiment.

FIG. 14 is a flow chart 1400 according to one exemplary embodiment from the perspective of a UE. In step 1405, the UE monitors a control channel for detection of an UL grant. In step 1410, the UE receives the UL grant associated with a HARQ (Hybrid Automatic Repeat Request) process on the control channel at a first timing. In step 1415, the UE sends an UL data associated with the UL grant on a data channel at a second timing. In step 1420, the UE starts a retransmission timer associated with the HARQ process after detection of the UL grant at a third timing.

In step 1425, the UE receives a signaling indicating stop the retransmission timer at a fourth timing. In one embodiment, the signaling could be a MAC (Medium Access Control) control signaling. In particular, the MAC control signaling could be a DRX MAC CE (Control Element).

In step 1430, the UE stops the retransmission timer and stopping monitoring the control channel, wherein the UE monitors the control channel when the retransmission timer is running.

Referring back to FIGS. 3 and 4, in one exemplary embodiment of a UE, the device 300 includes a program code 312 stored in the memory 310. The CPU 308 could execute program code 312 to enable the UE (i) to monitor a control channel for detection of a UL grant, (ii) to receive the UL grant associated with a HARQ process on the control channel at a first timing, (iii) to send an UL data associated with the UL grant on a data channel at a second timing, (iv)

to start a retransmission timer associated with the HARQ process after detection of the UL grant at a third timing, (v) to receive a signaling indicating stop the retransmission timer at a fourth timing, and (vi) to stop the retransmission timer and stopping monitoring the control channel, wherein the UE monitors the control channel when the retransmission timer is running. Furthermore, the CPU 308 can execute the program code 312 to perform all of the above-described actions and steps or others described herein.

Figure 15:
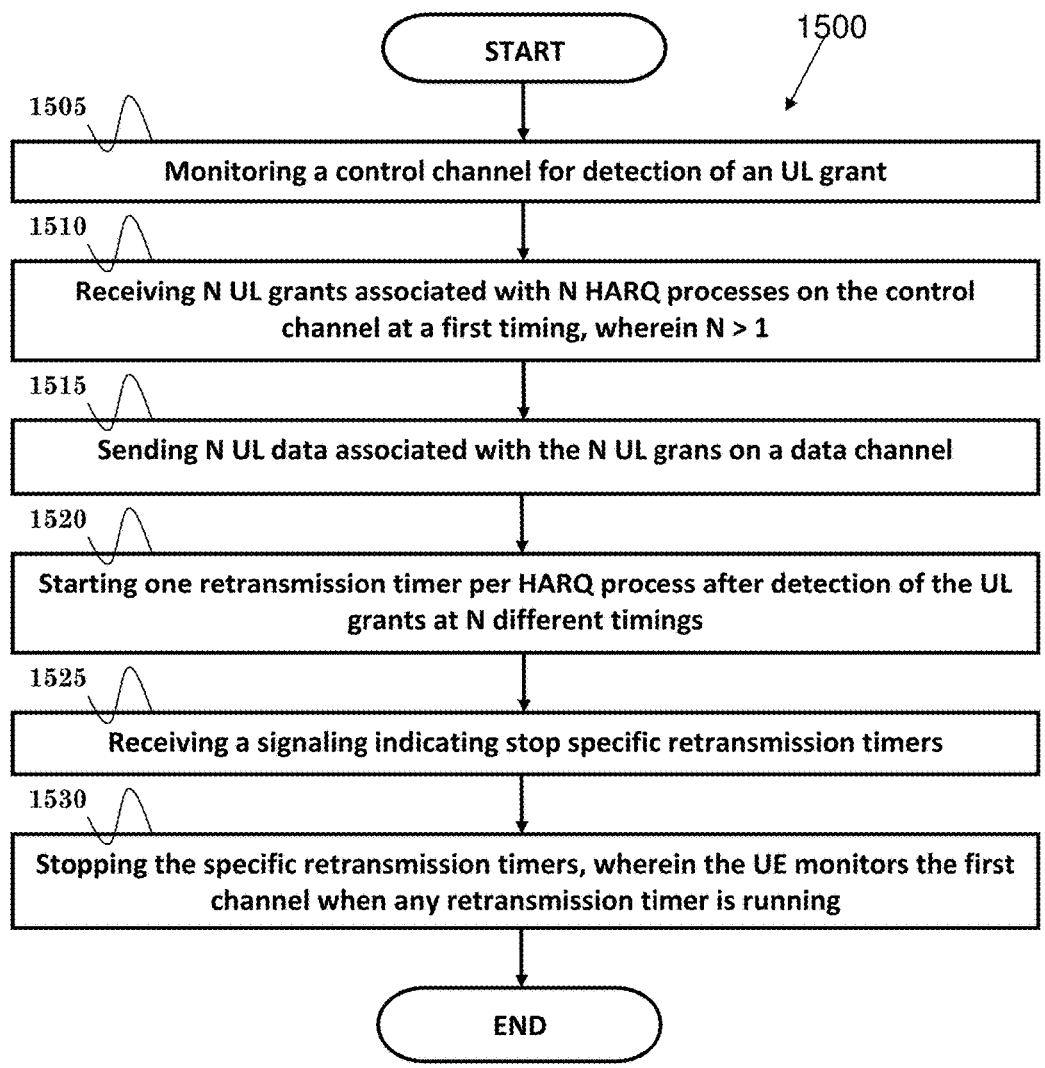
FIG. 15 is a flow chart according to one exemplary embodiment.

FIG. 15 is a flow chart 1500 according to one exemplary embodiment from the perspective of a UE. In step 1505, the UE monitors a control channel for detection of an UL (Uplink) grant. In step 1510, the UE receives N UL grants associated with N HARQ processes on the control channel, wherein N>1. In step 1515, the UE sends N UL data associated with the N UL grants on a data channel. In step 1520, the UE starts one retransmission timer per HARQ process after detection of the N UL grants at N different timings.

In step 1525, the UE receives a signaling indicating stop specific retransmission timers. In one embodiment, the signaling could be a MAC control signaling. In particular, the MAC control signaling could be a DRX MAC CE.

In step 1530, the UE stops the specific retransmission timers, wherein the UE monitors the control channel when any retransmission timer is running. In one embodiment, the number of the specific retransmission timers may be larger than one and smaller or equals to N.

Referring back to FIGS. 3 and 4, in one exemplary embodiment of a UE, the device 300 includes a program code 312 stored in the memory 310. The CPU 308 could execute program code 312 to enable the UE (i) to monitor a control channel for detection of an UL grant, (ii) to receive N UL grants associated with n HARQ processes on the control channel, wherein N>1, (iii) to send N UL data associated with the N UL grants on a data channel, (iv) to start one retransmission timer per HARQ process after detection of the UL grants at n different timings, (v) to receive a signaling indicating stop specific retransmission timers, and (vi) to stop the specific retransmission timers, wherein the UE monitors the control channel when any retransmission timer is running. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment) handling discontinuous reception (DRX) in a wireless communication system, comprising:
    monitoring a control channel for detection of a UL (Uplink) grant;
    receiving N UL grants associated with n HARQ (Hybrid Automatic Repeat Request) processes on the control channel, wherein N>1;
    sending N UL data associated with the N UL grants on a data channel;
    starting one retransmission timer per HARQ process after detection of the N UL grants at N different timings;
    receiving a signaling indicating stop specific retransmission timers in response to UL data being decoded successfully, wherein the number of specific retransmission timers is larger than one and smaller or equals to N; and
    stopping the specific retransmission timers, wherein the UE monitors the control channel when any retransmission timer is running.

2. The method of claim 1, wherein the signaling is a MAC (Medium Access Control) control signaling.

3. The method of claim 2, wherein the MAC control signaling is a DRX MAC CE (Control Element).

4. A User Equipment (UE), comprising:
    a control circuit;
    a processor installed in the control circuit; and
    a memory installed in the control circuit and operatively coupled to the processor;
    wherein the processor is configured to execute a program code stored in the memory to handle discontinuous reception (DRX) in a wireless communication system by:
        monitoring a control channel for detection of a UL (Uplink) grant;
        receiving N UL grants associated with n HARQ (Hybrid Automatic Repeat Request) process on the control channel, wherein N>1;
        sending N UL data associated with the N UL grants on a data channel;
        starting one retransmission timer per HARQ process after detection of the N UL grants at N different timings;
        receiving a signaling indicating stop specific retransmission timers in response to UL data being decoded successfully, wherein the number of specific retransmission timers is larger than one and smaller or equals to N; and
        stopping the specific retransmission timers, wherein the UE would monitor the control channel when any retransmission timer is running.

5. The UE of claim 4, wherein the signaling is a MAC (Medium Access Control) control signaling.

6. The UE of claim 5, wherein the MAC control signaling is a DRX MAC CE (Control Element).

* * * * *